US011713435B2

(12) United States Patent
Dougherty et al.

(10) Patent No.: US 11,713,435 B2
(45) Date of Patent: Aug. 1, 2023

(54) AMINOCARBOXYLATE CHELATING AGENTS AND DETERGENT COMPOSITIONS CONTAINING THEM

(71) Applicant: EASTMAN CHEMICAL COMPANY, Kingsport, TN (US)

(72) Inventors: Shawn Marie Dougherty, Kingsport, TN (US); Rong Xu, Johnson City, TN (US); Jeffrey Michael Clauson, Kingsport, TN (US); Brendan Patrick Abolins, Johnson City, TN (US); Kenneth Flint, Roanoke, VA (US); Mounir Izallalen, Kingsport, TN (US); Nicholas M. Martyak, Johnson City, TN (US); Ryan M. Thayer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 176 days.

(21) Appl. No.: 16/965,517

(22) PCT Filed: Jan. 17, 2019

(86) PCT No.: PCT/US2019/013972
§ 371 (c)(1),
(2) Date: Jul. 28, 2020

(87) PCT Pub. No.: WO2019/152208
PCT Pub. Date: Aug. 8, 2019

(65) Prior Publication Data
US 2021/0047590 A1 Feb. 18, 2021

Related U.S. Application Data

(60) Provisional application No. 62/623,692, filed on Jan. 30, 2018.

(51) Int. Cl.
| | | |
|---|---|---|
| *C11D 3/33* | (2006.01) | |
| *C02F 5/10* | (2023.01) | |
| *C11D 3/00* | (2006.01) | |
| *D06M 13/342* | (2006.01) | |

(52) U.S. Cl.
CPC .......... *C11D 3/33* (2013.01); *C02F 5/10* (2013.01); *C11D 3/001* (2013.01); *D06M 13/342* (2013.01)

(58) Field of Classification Search
CPC .... C11D 1/10; C11D 3/33; C11D 3/40; C11D 3/48; C11D 3/50; C11D 11/0017; C11D 11/0023
See application file for complete search history.

(56) References Cited

U.S. PATENT DOCUMENTS

| | | |
|---|---|---|
| 3,158,635 A | 11/1964 | Kezerian et al. |
| 3,451,928 A | 6/1969 | Fischer et al. |
| 4,641,671 A | 2/1987 | Nogi et al. |
| 4,704,233 A | 11/1987 | Hartman et al. |
| 5,030,651 A * | 7/1991 | Moll ............... A61K 31/30 514/912 |
| 5,057,302 A | 10/1991 | Johnson et al. |
| 5,786,313 A | 7/1998 | Schneider et al. |
| 5,849,950 A | 12/1998 | Greindl et al. |
| 6,165,970 A * | 12/2000 | Williams (nee Mac Beath) ......... C11D 3/33 510/318 |
| 6,172,036 B1 * | 1/2001 | Cruickshank ............ C11D 3/33 510/318 |
| 6,342,474 B1 | 1/2002 | Kerobo et al. |
| 6,727,215 B2 | 4/2004 | Roberts et al. |
| 6,995,125 B2 | 2/2006 | Dasque et al. |
| 6,998,099 B2 | 2/2006 | Hesse et al. |
| 7,125,828 B2 | 10/2006 | Catlin et al. |
| 7,368,418 B2 | 5/2008 | Diamond et al. |

(Continued)

FOREIGN PATENT DOCUMENTS

| | | |
|---|---|---|
| CA | 2272271 A1 | 6/1998 |
| CN | 102796623 A | 11/2012 |

(Continued)

OTHER PUBLICATIONS

Forgacs et al, European Journal of Inorganic Chemistry, © 2012 pp. 2074-2086.*

(Continued)

*Primary Examiner* — Charles I Boyer
(74) *Attorney, Agent, or Firm* — Tammye L. Taylor Polk

(57) ABSTRACT

Aminocarboxylate chelating agents are described having generic formulas selected from the group consisting of (A) and (B) wherein $R_1$ through $R_5$ are as further defined herein. Compositions containing at least one of these aminocarboxylate chelating agents are also described. The compositions are useful for example as detergent compositions for laundering clothing and compositions for cleaning dishes, in particular cleaning dishes using automatic dish washing devices.

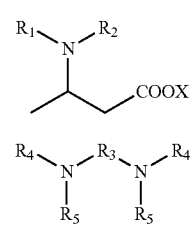

13 Claims, 5 Drawing Sheets

(56) References Cited

U.S. PATENT DOCUMENTS

| | | |
|---|---|---|
| 7,892,536 B2 | 2/2011 | Kelemen et al. |
| 8,287,764 B2 | 10/2012 | Van Lare et al. |
| 8,399,705 B2 | 3/2013 | Boonstra et al. |
| 8,551,312 B2 | 10/2013 | Heus et al. |
| 8,759,397 B2 | 6/2014 | Giles et al. |
| 8,906,199 B2 | 12/2014 | Giles et al. |
| 9,282,735 B2 | 3/2016 | Dixon et al. |
| 2002/0039980 A1* | 4/2002 | Yamamoto ........... C11D 3/2082 510/480 |
| 2009/0246671 A1* | 10/2009 | Suzuki ................. G03F 7/322 560/171 |
| 2010/0276152 A1 | 11/2010 | De Wolf et al. |
| 2011/0224118 A1* | 9/2011 | Creamer ................. C11D 3/33 510/230 |
| 2012/0004147 A1 | 1/2012 | Seetz et al. |
| 2012/0202731 A1 | 8/2012 | Mrzena et al. |
| 2013/0085094 A1* | 4/2013 | Leonard ................. C11D 3/33 510/471 |
| 2013/0165689 A1 | 6/2013 | Baumann et al. |
| 2013/0199569 A1 | 8/2013 | Cabirol et al. |
| 2013/0206181 A1 | 8/2013 | Giles et al. |
| 2014/0018282 A1 | 1/2014 | Wieland et al. |
| 2014/0038874 A1* | 2/2014 | Masters ............... C08G 18/758 510/109 |
| 2014/0080706 A1 | 3/2014 | Schnabel et al. |
| 2015/0329803 A1 | 11/2015 | Caires et al. |
| 2016/0130531 A1 | 5/2016 | Biel et al. |
| 2016/0160158 A1 | 6/2016 | Tuerk et al. |
| 2016/0311758 A1 | 10/2016 | Capracotta et al. |
| 2017/0275567 A1 | 9/2017 | Caires et al. |
| 2017/0321158 A1 | 11/2017 | Lant et al. |
| 2018/0263872 A1* | 9/2018 | Mueller ................... A61Q 5/10 |

FOREIGN PATENT DOCUMENTS

| | | |
|---|---|---|
| EP | 0 286 342 A2 | 10/1988 |
| EP | 2 388 308 A1 | 11/2011 |
| EP | 2 086 923 B1 | 8/2012 |
| EP | 2 176 215 B1 | 10/2014 |
| JP | 5462804 B2 | 4/2014 |
| JP | 5595363 B2 | 9/2014 |
| WO | WO 2013-093475 A1 | 6/2013 |
| WO | WO 2016-008765 A1 | 1/2016 |
| WO | WO 2016-083253 A1 | 6/2016 |
| WO | WO 2016-146813 A1 | 9/2016 |
| WO | WO 2017-005793 A1 | 1/2017 |

OTHER PUBLICATIONS

PCT International Search Report and Written Opinion dated May 14, 2019 for International Application No. PCT/US2019/013972.

Forgacs et al., "Influence of gem-Dimethyl Substitution on the Stability, Kinetics and Relaxometric Properties of PDTA Complexes", European Journal of Inorganic Chemistry, Chemische Berichte, No. 12, Apr. 1, 2012, pp. 2074-2086.

* cited by examiner

AMINOCARBOXYLATE CHELATING AGENTS AND DETERGENT COMPOSITIONS CONTAINING THEM

CROSS-REFERENCE TO RELATED APPLICATION(S)

This application is a national stage filing under 35 USC § 371 of International Application Number PCT/US2019/013972, filed on Jan. 17, 2019, which claims the benefit of the filing date to U.S. Provisional Application No. 62/623,692, filed on Jan. 30, 2018, the entire disclosures of which are incorporated by reference herein.

FIELD OF THE INVENTION

The present invention is generally directed to aminocarboxylate compounds that are useful as chelating agents; methods for the manufacture of such compounds; and compositions that include such compounds.

BACKGROUND OF THE INVENTION

Chelating agents are chemical compounds, typically organic in nature, which are used to trap, bind or remove metal ions from metal-ion containing systems such as aqueous solutions, processing streams and the like. Chelating agents, sometimes also referred to as sequestering agents, include multidentate ligands and function by forming one or more chemical bonds or otherwise associating or coordinating with the metal ions.

Chelating agents are useful in a wide variety of applications including household and industrial cleaning formulations, water treatment, pulp and paper and manufacturing, agriculture and textile treatment. In the field of household and industrial cleaning compositions, two particular examples in which chelating agents play a critical role are of significant interest to both consumers and manufacturers: laundry cleaning compositions and dish cleaning compositions. The main function of a chelating agent in laundry compositions is to improve the cleaning and stain removing performance of the compositions by removing metal ions such as iron and manganese. In dish cleaning compositions, in particular detergents for use in automatic dishwashers, the main function of a chelating agent is to reduce water hardness and related scale deposits and water spots on dishware by removing calcium, magnesium and other metals. More generally, the most versatile chelating agents that have utility in a variety of end-use applications will balance a number of important features, such as for example good solubility; strong binding affinity for one or more key metals including $Fe^{2+}$, $Fe^{3+}$, $Mg^{2+}$ and $Ca^{2+}$; low toxicity; and a higher likelihood or tendency to biodegrade.

In the prior art, as exemplified by U.S. Pat. No. 3,451,928, EP 286342 A2 and CN 102796623, phosphates were used as chelating agents in cleaning formulations; however, these materials have been alleged to have a deleterious effect when present in natural bodies of water, purportedly creating algae blooms and starving fish of oxygen. Use of phosphates in these formulations has been therefore discouraged and in fact has been banned by governmental entities in some jurisdictions.

Aminocarboxylates have also been investigated for utility as chelating agents. Ethylenediamine derivatives (such as EDTA and DTPA) or sodium citrate have been commercially marketed as chelating agents for many years; however, neither exhibit the level of biodegradability or performance demanded in today's cleaning formulations. As described in U.S. Pat. Nos. 5,849,950 and 5,786,313, methylglycine diacetic acid (MGDA) and/or salts thereof have utility in dish cleaning compositions as a detergent builder and sequestering agent; however, the methods suitable for commercial manufacturing of this material involve use of undesirable reactants such as formaldehyde and cyanide compounds and potential generation of toxic by-products such as nitrilotriacetic acid (NTA). Also, the presence of MGDA in dish cleaning applications can damage decorative patterns or lettering printed on glassware. In addition, the cost to manufacture MGDA often translates to a price which excludes it from all but the highest-performing and most expensive cleaning formulations. Another prior art chelating agent with a degree of biodegradability but a similarly high cost to manufacture (and therefore commercial price) is ethylenediamine N,N'-disuccinic acid, or alkali metal, alkaline earth metal, ammonium or substituted ammonium salts thereof or mixtures thereof. Ethylenediamine N,N'-disuccinic acids, especially the (S,S) isomer, are described for example in U.S. Pat. No. 4,704,233.

A continuing need exists, therefore, for a chelating agent with biodegradability, competitive effectiveness and lower cost when compared to existing product offerings and which may be manufactured using environmentally friendly reactants and methods.

SUMMARY OF THE INVENTION

In a first aspect, the present invention relates to aminocarboxylate chelating agents having a formula selected from the group consisting of

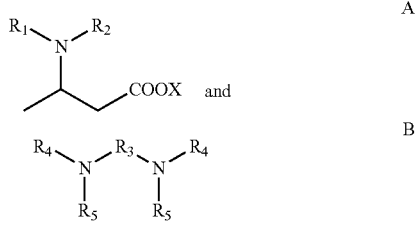

wherein, in formula A, $R_1$ is H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_2$ is $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof; and in formula B, $R_3$ is 1,4-dimethyl cyclohexane or 2,2-dimethylpropane; $R_4$ is each H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_5$ is each $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof.

In a second aspect, the present invention relates to compositions that include at least one aminocarboxylate chelating agent, wherein said at least one aminocarboxylate chelating agent has a formula selected from the group consisting of:

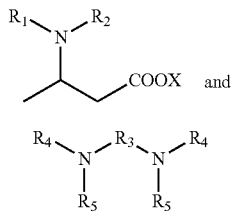

A

B wherein, in formula A, $R_1$ is H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_2$ is $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof; and, in formula B, $R_3$ is 1,4-dimethyl cyclohexane or 2,2-dimethylpropane; $R_4$ is each H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_5$ is each $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof.

Further aspects of the invention are as disclosed and claimed herein.

DETAILED DESCRIPTION

Figure 1:
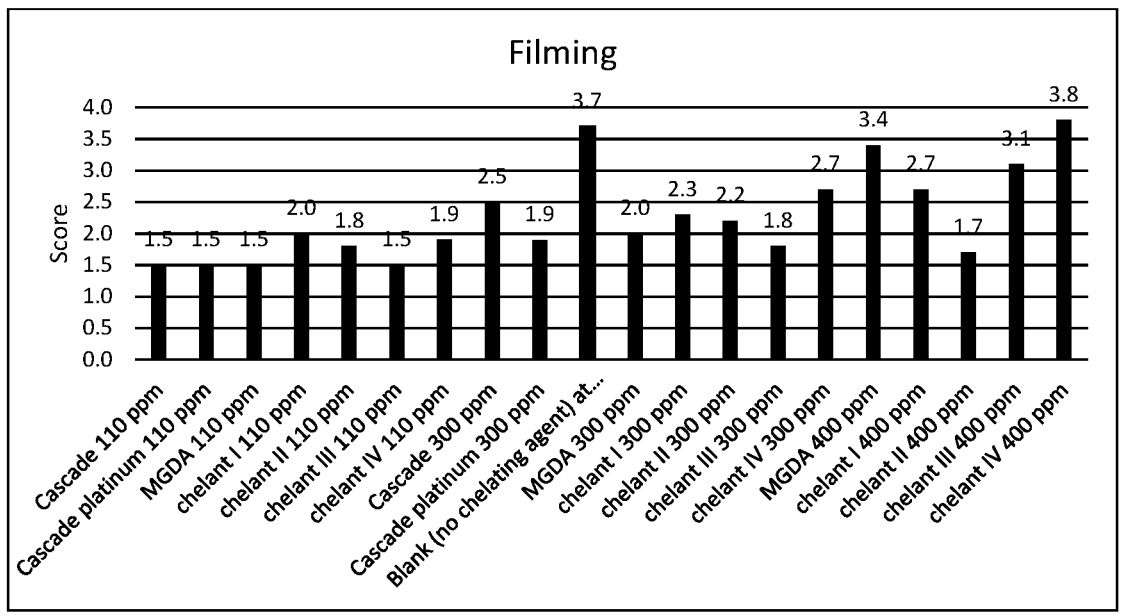
FIG. 1 is a graphical representation of the data generated in Example 1 hereunder demonstrating the filming resistance of the present invention.

In the first aspect, the present invention is directed to an aminocarboxylate chelating agent having a formula selected from the group consisting of

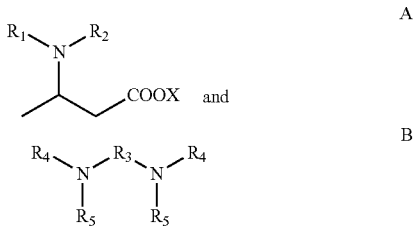

A

B wherein, in formula A, $R_1$ is H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_2$ is $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof; and in formula B, $R_3$ is 1,4-dimethyl cyclohexane or 2,2-dimethylpropane; $R_4$ is each H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; $R_5$ is each $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof.

In an embodiment, metals for X are selected from the group consisting of alkali metals and alkaline earth metals and more preferably are selected from the group consisting of alkali metals.

Specific examples of the aminocarboxylate chelating agents of the present invention include without limitation trisodium 2,2'-((1-carboxypropan-2-yl)azanediyl)diacetate (I)

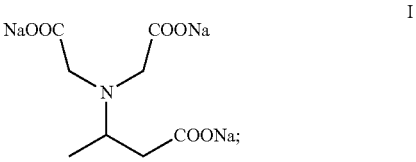

I tetrasodium 2,2'-((2,2-dimethylpropane-1,3-diyl)bis(azanediyl))disuccinate (II)

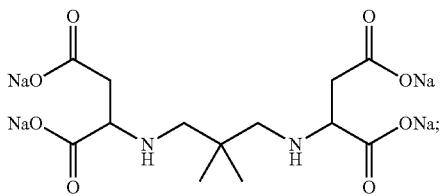

tetrasodium 2,2',2'',2'''-((cyclohexane-1,4-diylbis(methylene))bis(azanetriyl))tetraacetate (III)

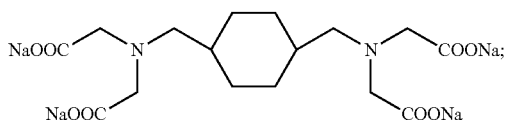

Tetrasodium 2,2'-((cyclohexane-1,4-diylbis(methylene))bis(azanediyl))disuccinic acid (IV)

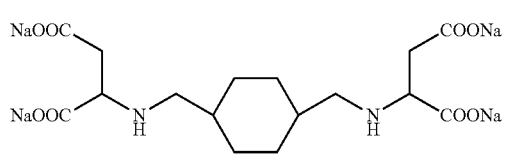

and trisodium (1-carboxypropan-2-yl)aspartate (V)

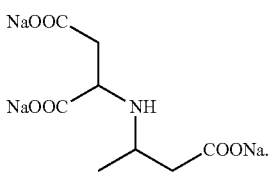

The aminocarboxylate chelating agents of the present invention may be formed by methods known in the art for aminocarboxylate compound manufacture. Such methods include without limitation Strecker synthesis as described in U.S. Pat. No. 5,849,950; reductive amination as described in U.S. Pat. No. 5,057,302; catalytic dehydrogenation of N-alkyl alcohol as described in U.S. Published Patent Application No. 2013/0165689; and Michael addition as described in U.S. Pat. No. 3,158,635. The contents and description of U.S. Pat. Nos. 5,849,950; 5,057,302; U.S. Published Patent Application No. 2013/0165689; and U.S. Pat. No. 3,158,635 are hereby incorporated herein by reference.

The aminocarboxylate chelating agents of the present invention may be in any physical form suitable for its desired end use. In an embodiment, the chelating agent is in liquid form such as a solution, dispersion or suspension. In another embodiment, the chelating agent is in solid form, such as for example particle form or powder form. In this embodiment, the particle or powder may optionally include a coating formed from, for example clay-like, silica-based or polarity-reducing materials that may be applied in additional process steps including precipitation from a suspension and spraying of the solid particles suspended in liquid fluidized beds, to for example improve flowability and/or material handling particularly for chelating agents of relatively higher hygroscopicity. Coatings for such purposes and methods for their application are described for example in U.S. Pat. No. 8,287,764 and U.S. Published Patent Application No. 2012/0004147, the contents and description and which are hereby incorporated herein by reference. In this embodiment, the chelating agent of the present invention is in the form of a coated particle or powder. It should be understood, however, that the presence of such coatings and details such as their amount, thickness, composition etc. depend on a variety of factors such as the end-use application and relative hygroscopicity of the chelating agent. In an embodiment, therefore, the chelating agent of the present invention may be in form of an uncoated particle or powder.

In an embodiment, the aminocarboxylate chelating agents of the present invention are biodegradable. As used herein, the term "biodegradable" is meant to include at least one of inherently biodegradable as determined by relevant and known analytical test methods or protocols such as OECD 302 B; readily biodegradable as determined by relevant and known analytical test methods or protocols such as those described in OECD 301 D and 301 F; and so-called predictive biodegradability as determined by computer models or software. Such computer models are known in the art and may be exemplified by BIOWIN™, which is available through the U.S. Environmental Protection Agency (see https://www.epa.gov/tsca-screening-tools/epi-suitetm-estimation-program-interface) and which estimates aerobic and anaerobic biodegradability of organic chemicals using 7 different models. In a preferred embodiment, "biodegradable" is one or both of inherently biodegradable and readily biodegradable.

A second aspect of the present invention is directed to a composition that includes at least one aminocarboxylate chelating agent wherein the at least one aminocarboxylate chelating agent has a formula selected from the group consisting of the aminocarboxylate chelating agents described in the first aspect above. Accordingly, a second aspect of the present invention is a composition that includes at last one aminocarboxylate chelating agent wherein the at least one aminocarboxylate chelating agent has a formula selected from the group consisting of

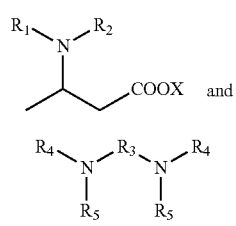

wherein, in formula A, $R_1$ is H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_2$ is $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof; and in formula B, $R_3$ is 1,4-dimethyl cyclohexane or 2,2-dimethylpropane; $R_4$ is each H or $CH_2COOX$ where X is selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; and $R_5$ is each $CH_2COOX$ with X selected from the group consisting of hydrogen, metal, ammonium or substituted ammonium, a linear alkyl chain, unsubstituted or substituted alkyl, alkenyl, alkoxylate groups, glycols such as poly(ethylene glycol), phenylalkyl, phenyl or a heterocyclic ring; or succinic acid or a metal or ammonium salt thereof.

The term "composition", as used herein, is meant to include without limitation (i) formulations, mixtures, blends and the like, for example in liquid, gel, powder or tablet form, wherein multiple ingredients are combined as well as (ii) combinations of ingredients packaged or sold as a single unit, such as one or more water-soluble pouches, wherein individual ingredients or certain combinations thereof may be maintained in physical separation until just prior to use. Such ingredient combinations are described for example in U.S. Pat. Nos. 7,125,828; 6,727,215 and 6,995,125, the contents and description of which are hereby incorporated herein by reference.

In a specific embodiment, the composition of the present invention includes at least one aminocarboxylate chelating agent selected from the group consisting of (i) trisodium 2,2'-((1-carboxypropan-2-yl)azanediyl)diacetate; (ii) tetrasodium 2,2'-((2,2-dimethylpropane-1,3-diyl)bis(azanediyl)) disuccinate; (iii) tetrasodium 2,2',2",2"'-((cyclohexane-1,4-diylbis(methylene))bis(azanetriyl))tetraacetate; (iv) tetrasodium 2,2'-((cyclohexane-1,4-diylbis(methylene))bis (azanediyl))disuccinate; and (v) trisodium (1-carboxypropan-2-yl)aspartate.

In an embodiment, the at least one aminocarboxylate chelating agent is present in the composition of the present invention in an amount of from 0.2% to 10.0% by weight based on the total weight of the composition. In an embodiment, the at least one aminocarboxylate chelating agent is present in the composition of the present invention in an amount of from 0.2% to 5.0% by weight based on the total weight of the composition. In an embodiment, the at least one aminocarboxylate chelating agent is present in the composition of the present invention in an amount of from 1.0% to 10.0% by weight based on the total weight of the composition. One of ordinary skill will appreciate that, should the compositions of the present invention include other chelating agents, the amount of the at least one aminocarboxylate chelating agent may be relatively lower.

In these embodiments, the compositions of the present invention are typically compositions for laundering clothing and the like and further include ingredients known to a person of ordinary skill in the art as useful in such clothes laundering compositions. Non-limiting examples of such ingredients include one or more of detersive surfactants, soil release agents, bleach or other chlorine-releasing agents, bleach activators, enzymes, bleach catalysts, anti-foamants, suds suppression agents, germicides, antimicrobials, photoactivators, dyes, perfumes, fluorescers, fabric conditioners and the like. Compositions for laundering clothing and methods for their manufacture are generally known in art and are described for example in U.S. Pat. Nos. 7,368,418 and 7,892,536 and U.S. Published Patent Application No. 2017/0275567, the contents and description of which are each hereby incorporated herein by reference.

In another embodiment, the at least one aminocarboxylate chelating agent is present in the composition of the present invention in an amount of from 10% to 50% by weight, preferably 20% to 30% by weight, based on the total weight of the composition. One of ordinary skill will appreciate that, should the compositions of the present invention include other chelating agents, the amount of the at least one aminocarboxylate chelating agent may be relatively lower.

In this embodiment, the composition of the present invention is typically a composition for dishware cleaning, more particularly a composition for dishware washing in commercially available automatic washing devices such as described for example in U.S. Pat. No. 4,641,671, the contents and description of which are hereby incorporated herein by reference. "Dishware" as used herein is meant to include items typically used in conjunction with storage, preparation or consumption of food such as plates, bowls and cups; eating utensils such as knives, forks and spoons; food storage containers; food container opening utensils, and food preparation utensils such as pots and pans. In this embodiment, the composition of the present invention includes ingredients known to a person of ordinary skill in the art as useful in such dishware cleaning or washing compositions. Non-limiting examples of such ingredients include one or more of enzymes, surfactants, organic and inorganic detergent builders, glycols, soda ash, bleach or chlorine-releasing agents, compatibilizers, alkali materials, sequestering agents, enzyme stabilizing agents, reducing agents, china protecting agents, corrosion inhibitors, defoamers and suds suppression ingredients, soil suspending ingredients, drainage promoting ingredients, dyes, perfumes, fillers, thickeners, crystal modifiers and the like. Compositions for dishware washing and methods for their manufacture are generally known in the art and are described for example in U.S. Published Patent Application Nos. 2013/0199569A1, 2017/0321158A1 and 2017/0275567A1, the contents and description of which are each hereby incorporated herein by reference.

While the composition of the present invention has been described above in detail with respect to two exemplary embodiments with two end-use utilities, it will be understood by the person of ordinary skill that the composition of the present invention may be utilized in a wide variety of end-use applications and may include the chelating agent in any amount desired to achieve desired performance in those applications. For example, the compositions of the present invention may be useful in other cleaning applications, for example upholstery cleaners, carpet cleaners, hard surface cleaners as well as utilities such as water treatment, pulp and paper manufacturing and agrochemical processing.

The following examples set forth suitable and/or preferred methods and results in accordance with the invention. It is to be understood, however, that these examples are provided by way of illustration and nothing therein should be taken as a limitation upon the overall scope of the invention. All percentages are by weight unless otherwise specified.

Example 1

This example demonstrates the filming resistance and spotting resistance of consumer dish cleaning compositions of the present invention which include aminocarboxylate chelating agents of the present invention. Tests on dishes soiled with fatty residue were performed at varying water hardness levels. Tests were performed according to procedures set forth in ASTM D3556. Test compositions were formulated using the ingredients listed in Table 1 below.

TABLE 1

| Ingredients | wt % |
| --- | --- |
| Sodium Sulphate | 15.4 |
| Britesil C20 (Disilicate) | 2.0 |
| Soda Ash Dense | 36.5 |
| Sodium Percarbonate | 15 |
| Accusol 445 (Polymer) | 3.0 |
| Valfor 100 (Zeolite) | 0.1 |
| Ovozyme 64T (Protease) | 1.0 |
| Stainzyme 12T (Amylase) | 1.0 |
| Purafact - SLF 180 (Surfactant) | 3.0 |
| Chelating agent | 23 |
| total | 100 |

Figure 2:
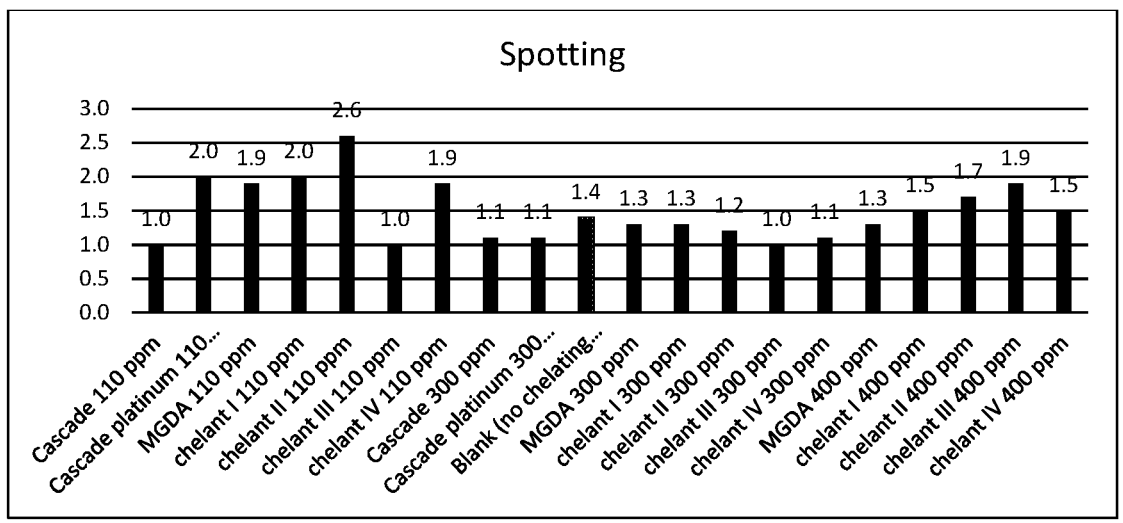
FIG. 2 is a graphical representation of the data generated in Example 1 hereunder demonstrating the spotting resistance of the present invention.

For comparison purposes a control formulation using MGDA as the chelating agent was prepared. Commercial formulations sold by Procter & Gamble under the trade names Cascade™ and Cascade Platinum™ were also procured and tested for comparative control purposes. Water hardness levels for each separate test run were adjusted to 110, 300 and 400 ppm by feeding a source of $Ca^{2+}/Mg^{2+}$ solution into a municipal water source. Spotting and filming were evaluated according to the following standards:

| Score | Spotting | Filming |
| --- | --- | --- |
| 1 | No spots | No filming |
| 2 | Ransom spots | Barely perceptible |
| 3 | ¼ surface covered | Slight |
| 4 | ½ surface covered | Moderate |
| 5 | Almost completely covered | Heavy | with test results set forth in FIGS. 1 and 2.

Example 2

This example demonstrates the stain removal efficacy of liquid laundry cleaning compositions of the present invention which include as a component an aminocarboxylate chelating agent of the present invention. Tests for cleaning fabric swatches were performed in accordance with ASTM D4265, wherein standard stained swatches using the stainants listed in Table 3 below were purchased, processed according to ASTM method and the relative degree of stain removal evaluated instrumentally. Stain removal was calculated by measuring the colorimetric reflectance of stain swatches and unstained stain swatches treated under the same condition to calculate as described in ASTM D4265 the stain removal index (SRI). To better isolate and evaluate the function and performance of the aminocarboxylate chelating agents, compositions including only chelating agent and essential surfactants were formulated for this testing in accordance with Table 2 below:

TABLE 2

| Ingredient | Function | Final wt % |
| --- | --- | --- |
| Decaethylene glycol mono-dodecyl ether (100 wt % linear alcohol ethoxylate C12-EO10) | Nonionic surfactant | 12.0 |
| Alkyl (C10-C16) benzenesulfonic acid (30.3 wt % neutralized solution) | Anionic surfactant | 6.0 |
| Alkyl (C10-C16) ether sulfate (25.8 wt % solution) | Anionic surfactant | 6.0 |
| Chelating Agent (100 wt % solids) | Reduce water hardness, etc. | 2.0 |
| Sodium bicarbonate (100% solids) | Builder | 0.6 |
| Deionized water | Diluent | 73.4 |

In addition to compositions of the present invention, compositions containing EDTA and DPTA as chelating agents were also formulated and tested as controls. The results of this testing are set forth in Table 3 below, with numeric values corresponding to the stain removal index (SRI) with fabric alone having numeric value of zero and stains prior to washing having a numeric value of 100:

TABLE 3

| Stain | EDTA | DTPA | I | II | IV | III |
| --- | --- | --- | --- | --- | --- | --- |
| peat | 52.40 | 49.81 | 49.99 | 53.70 | 51.32 | 50.69 |
| animal fat/red dye | 7.49 | 5.93 | 5.17 | 5.46 | 4.66 | 6.11 |
| Motor Oil | 37.43 | 38.51 | 35.46 | 36.58 | 35.09 | 35.83 |
| red wine | 27.77 | 27.93 | 26.11 | 25.77 | 22.46 | 24.64 |
| dessert (chocolate) | 44.56 | 41.71 | 42.46 | 44.02 | 40.09 | 33.02 |
| grass | 53.50 | 49.99 | 50.49 | 54.10 | 50.01 | 50.90 |
| butter | 12.78 | 13.76 | 11.38 | 11.95 | 3.73 | 9.73 |
| curry | 21.03 | 18.07 | 19.75 | 18.43 | 17.19 | 17.44 |
| blood | 81.31 | 80.56 | 81.16 | 81.81 | 81.76 | 78.33 |
| beta-carotene | 38.62 | 34.09 | 33.50 | 38.40 | 39.74 | 39.38 |
| clay | 18.32 | 22.23 | 23.72 | 24.22 | 21.51 | 17.93 |
| make-up | 15.09 | 12.79 | 13.78 | 14.31 | 11.84 | 11.97 |
| tomato sauce | 18.85 | 19.00 | 24.83 | 20.90 | 22.23 | 21.67 |
| tea | 5.46 | 4.29 | 5.53 | 4.77 | 3.26 | 3.13 |
| babyfood | 28.50 | 30.70 | 31.45 | 32.26 | 33.07 | 26.30 |

Example 3

This example demonstrates the filming resistance and spotting resistance of industrial and institutional (I&I)-type dish cleaning compositions of the present invention which include aminocarboxylate chelating agents of the present invention. Caustic compositions were formulated in accordance with Table 4 below:

TABLE 4

| Ingredient | wt % |
| --- | --- |
| Chelating agent | 15 |
| anti-deposition agent (Acusol ™ 445) | 2 |
| Sodium hydroxide (50% active) | 30 |
| Balance water | 53 |
| Total | 100 |

Figure 3:
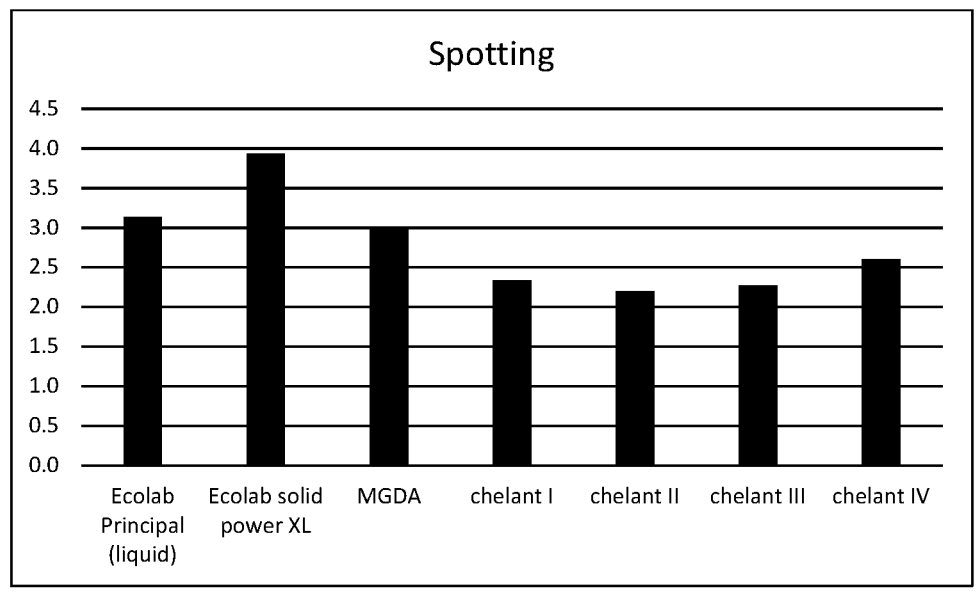
FIG. 3 is a graphical representation of the data generated in Example 3 hereunder demonstrating the spotting resistance of the present invention.
Figure 4:
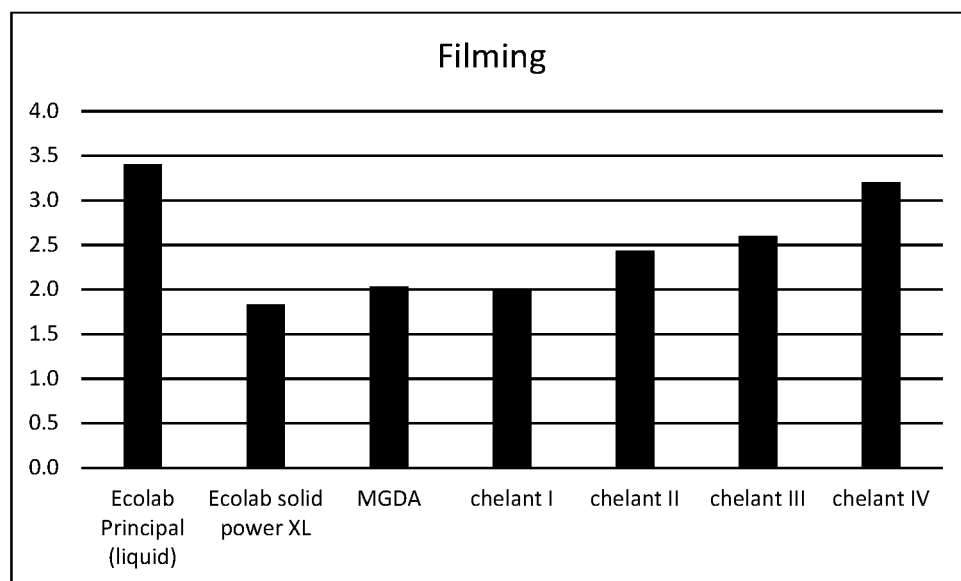
FIG. 4 a graphical representation of the data generated in Example 3 hereunder demonstrating the filming resistance of the present invention.

For comparison purposes a control formulation using MGDA as the chelating agent was prepared. Commercial formulations sold by Ecolab under the trade names Ecolab™ Solid Powder XL and Ecolab™ Principal were also procured and tested for comparative control purposes. The water hardness levels for each separate test run was 37 ppm. For tests under this example, an Ecolab commercial single chamber dish washing machine was used. Each wash test included 6 soiled dinner plates and 3 drinking glasses. The soil was made up by Margarine/powdered milk (80/20) applied to the dinner plates prior to washing. The temperature during washing was 145°–154° F. for 50-60 sec, then 160°–190° F. during rinsing for 10-15 seconds, total cycle time was less than 2 min. In each cycle, 8 g of composition was added into the ditch inside the dishwasher. The glasses were evaluated after three cycles. Spotting and filming were visually evaluated according to the criteria applied in Example 1 and set forth above with test results set forth in FIGS. 3 and 4.

Example 4

This example demonstrates the antimicrobial properties of the aminocarboxylate chelating agents of the present invention. The chelating agents of the present invention were prepared at 0.1% (w/w) concentration in sterile water containing 2% tryptic soy broth (TSB). Controls of 0.10% (w/w) MGDA in sterile water plus 2% soy broth and also sterile water with 2% tryptic soy broth (no chelating agent) were also prepared. Two types of microbial isolates that are commonly used for antimicrobial test were adopted: a bacterial isolate of Escherichia coli (E. coli) and a fungal isolate of Candida albicans (C. albicans). Two-day old cultures of isolates E. coli and C. albicans were suspended in Butterfield's buffer to a concentration between E+05 to E+06 CFU/mL to prepare the inoculum. The inoculum was added at 1% (v/v) into the chelating agent solutions. The final pH of prepared mixture was 7.5-8.5. After inoculation, the tubes with mixture were incubated at room temperature and the microbial level in each tube was determined by plate counting at different days.

Figure 6:
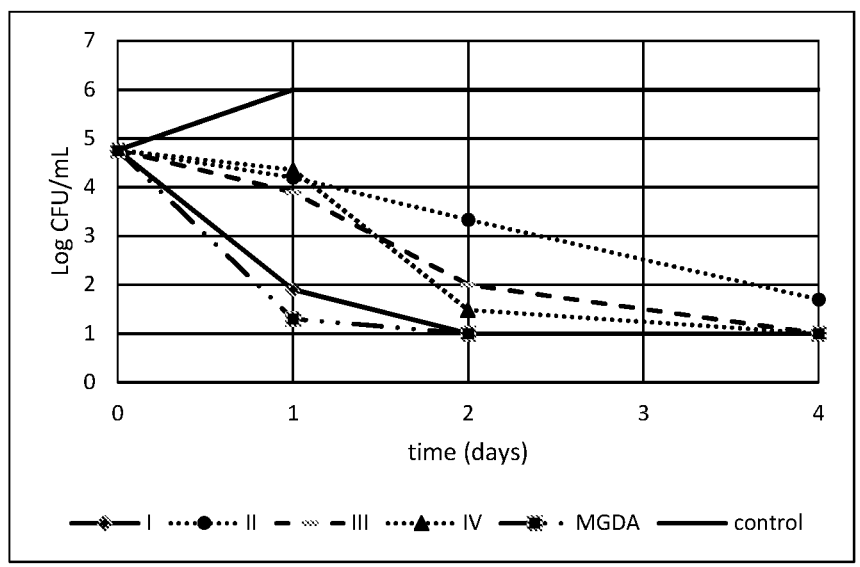
FIG. 6 is a graphical representation of the data generated in Example 4 demonstrating the antimicrobial (*E. coli*) efficacy of the chelating agents of the present invention.
Figure 7:
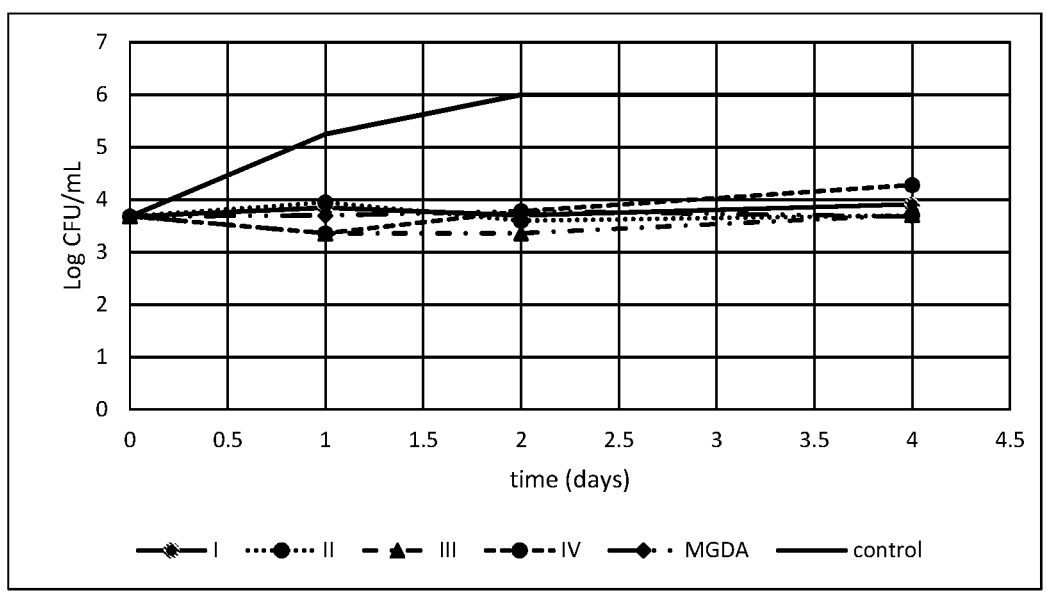
FIG. 7 is a graphical representation of the data generated in Example 4 demonstrating the antimicrobial (*C. albicans*) efficacy of the chelating agents of the present invention.

The chelating agents of the present invention demonstrated antimicrobial activities on E. coli during a four-day period as shown in FIG. 6. The antimicrobial effectiveness of the chelating agents of the present invention on C. albicans was indicated as growth inhibition and is shown in FIG. 7.

Example 5

Figure 5A:
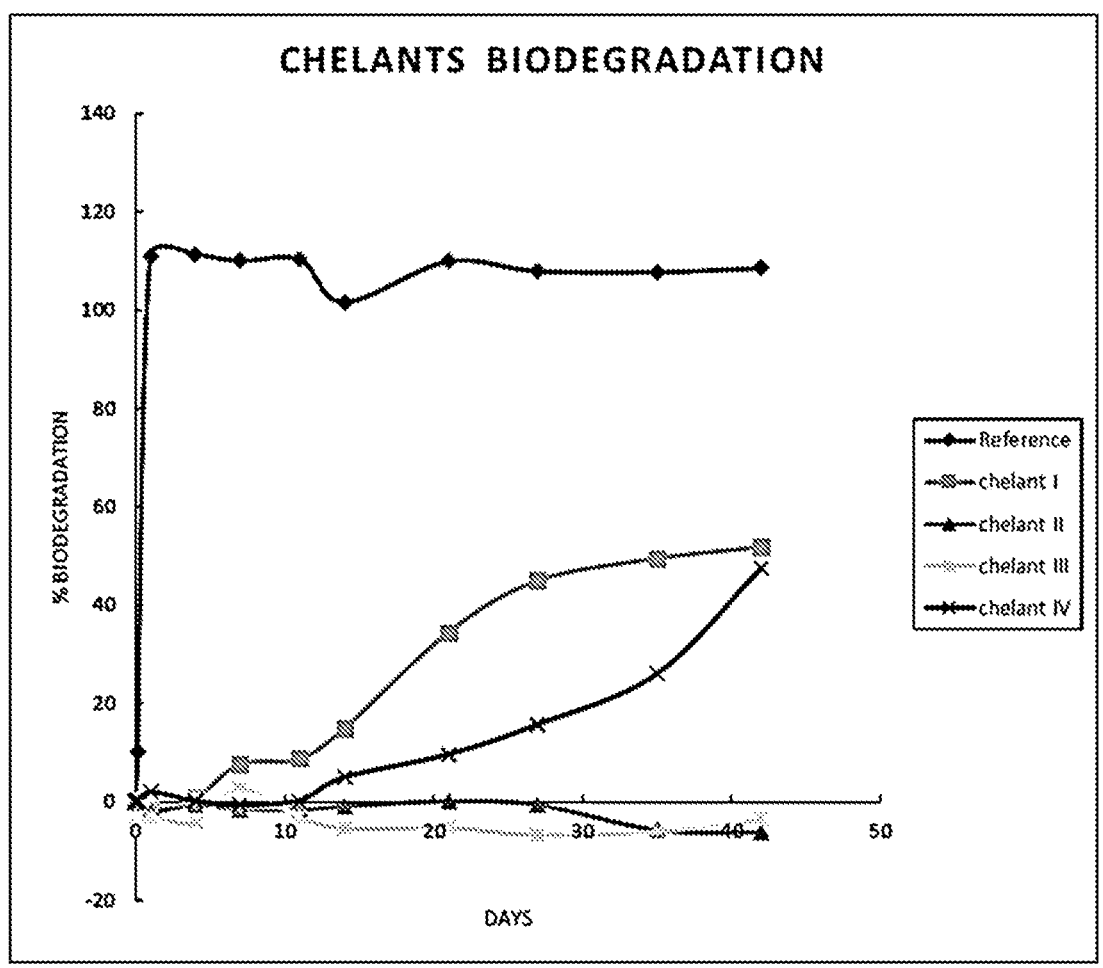
FIGS. 5*a* and 5*b* are graphical representations of the data generated in Example 5 demonstrating the relative tendencies of the chelating agents of the present invention to biodegrade.
Figure 5B:
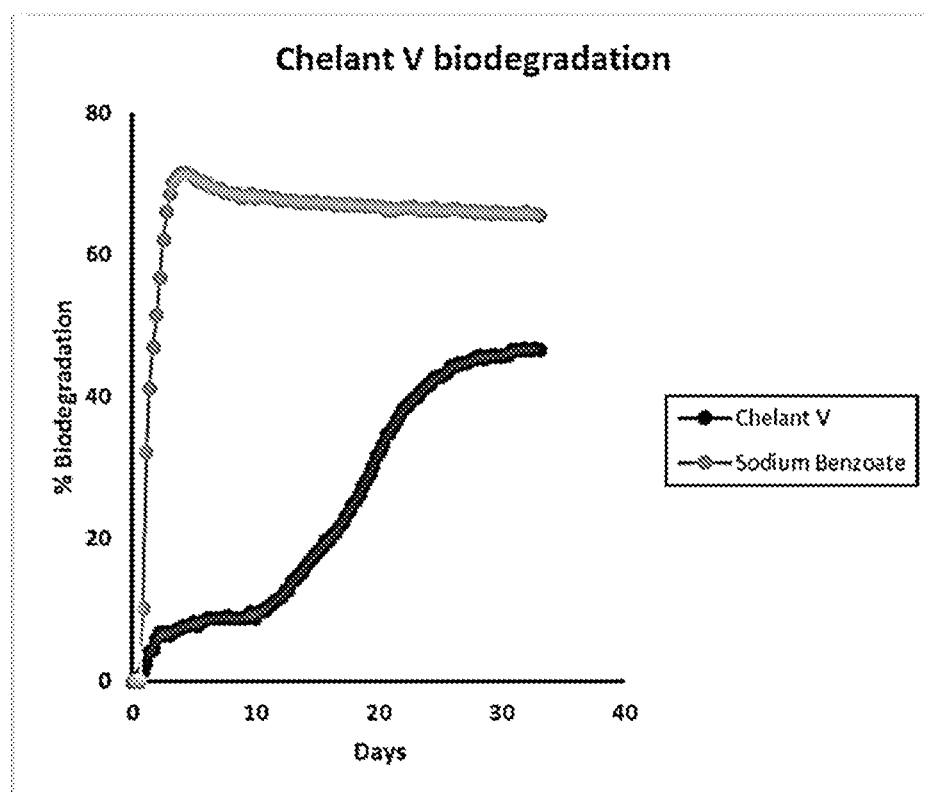

This example demonstrates the relative tendencies of the chelating agents of the present invention to inherently biodegrade. Chelating agents of the present invention were tested in accordance with procedures described in OECD 302 B. The results of these tests are depicted in FIGS. 5a and 5b.

Example 6

In order to produce the aminocarboxylate chelating agent trisodium 2,2'-((1-carboxypropan-2-yl)azanediyl)diacetate (compound I above) using a Strecker synthesis method, hydrocyanic acid and formaldehyde is fed simultaneously to a suspension of 3-aminobutanoic acid. The mixture is stirred for certain time at ambient temperature and the formed dicyano product is hydrolyzed by 50% sodium hydroxide solution.

Example 7

In order to produce the aminocarboxylate chelating agent trisodium 2,2'-((1-carboxylatopropan-2-yl)azanediyl) diacetate (compound I above) using a Michael addition synthesis method, ethyl 3-aminobutanoate (100 g, 762 mmol) was added to a 2000 mL three neck flask equipped with overhead stirrer, and then diluted with 800 mL $CH_3CN$. To this stirring mixture was added potassium carbonate (211 g, 1525 mmol) then NaI (229 g, 1525 mmol) in portions. The flask was then cooled by cold water and methyl 2-chloroacetate (165 g, 1525 mmol) added dropwise through an addition funnel. The internal temperature was controlled below 35° C. by adjusting addition rate. The mixture was stirred under nitrogen for 6 days and reaction progress was monitored by gas chromatography until conversion was 97%. The mixture was then filtered to remove solid. The obtained filtrate was then evaporated on rotavap to remove acetonitrile. The crude was then redissolved in 500 mL EtOAc and extracted with 500 mL water. The aqueous layer was extracted twice with 200 mL EtOAc. The organic layer was combined and dried on $MgSO_4$. The solvent was then evaporated on rotary evaporator to dryness. The resulted thick oil was further dried on high vacuum to give dimethyl 2,2'-((4-ethoxy-4-oxobutan-2-yl)azanediyl)diacetate (1) as product in 87% yield.

To a 2 L three neck flask, was added dimethyl 2,2'-((4-ethoxy-4-oxobutan-2-yl)azanediyl) diacetate (1) (398.8 g, 1.45 mol). While the flask was heated to 60° C., a NaOH solution containing 174 g (4.35 mol) NaOH in 270 mL water was added dropwise to the flask through addition funnel. After addition finished, a nitrogen line was used to sparge under the liquid surface. Gas chromatograph of the extractant was used to determine the completion of conversion. 300 mL EtOH was added to the crude to precipitate out the salt, followed by filtration to give a white solid, which was then dried under vacuum oven at 60° C. to yield trisodium 2,2'-((1-carboxylatopropan-2-yl)azanediyl)diacetate (I).

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A detergent composition comprising:
   A) from 0.2 to 50% of at least one aminocarboxylate chelating agent, wherein said at least one aminocarboxylate chelating agent is selected from the group consisting of:
      (i) trisodium 2,2'-((1-carboxypropan-2-yl)azanediyl)diacetate; and
      (ii) tetrasodium 2,2'-((2,2-dimethylpropane-1,3-diyl)bis(azanediyl))disuccinate; and
   B) at least one detergent additive selected from the group consisting of detersive surfactants, soil release agents, bleach or other chlorine-releasing agents, bleach activators, enzymes, bleach catalysts, anti-foamants, suds suppression agents, germicides, antimicrobials, photoactivators, dyes, perfumes, fluorescers, organic or inorganic detergent builders, glycols, soda ash, compatibilizers, alkali materials, sequestering agents, enzyme stabilizing agents, reducing agents, china protecting agents, corrosion inhibitors, defoamers and suds suppression ingredients, soil suspending ingredients, drainage promoting ingredients, fillers, thickeners, crystal modifiers, and fabric conditioners.

2. The composition of claim 1 wherein said at least one aminocarboxylate chelating agent is trisodium 2,2'-((1-carboxypropan-2-yl)azanediyl)diacetate.

3. The composition of claim 1, wherein said at least one aminocarboxylate chelating agent is tetrasodium 2,2'-((2,2-dimethylpropane-1,3-diyl)bis(azanediyl))disuccinate.

4. The composition of claim 1 wherein said at least one aminocarboxylate chelating agent is present in said composition in an amount from 0.2 to % to 5.0% by weight based on the total weight of said composition.

5. The composition of claim 2 wherein said at least one aminocarboxylate chelating agent is present in said composition in an amount from 0.2 to % to 5.0% by weight based on the total weight of said composition.

6. The composition of claim 3 wherein said at least one aminocarboxylate chelating agent is present in said composition in an amount from 0.2 to % to 5.0% by weight based on the total weight of said composition.

7. The composition of claim 1 wherein said at least one aminocarboxylate chelating agent is present in said composition in an amount from 1.0 to % to 10.0% by weight based on the total weight of said composition.

8. The composition of claim 1, wherein said composition is a laundry cleaning composition.

9. The composition of claim 1 wherein said aminocarboxylate chelating agent is present in an amount of from 10% to 50% by weight based on the total weight of said composition.

10. The composition of claim 1 wherein said composition is a dishware cleaning composition.

11. The composition of claim 10 wherein said dishware cleaning composition is a composition for dishware washing in automatic washing devices.

12. The composition of claim 1 wherein said at least one aminocarboxylate chelating agent is biodegradable.

13. The composition of claim 1 wherein said at least one aminocarboxylate chelating agent is one or both of inherently biodegradable and readily biodegradable.

* * * * *